(12) United States Patent
Rückert et al.

(10) Patent No.: US 6,647,821 B2
(45) Date of Patent: Nov. 18, 2003

(54) TRANSMISSION SHIFT LEVER ASSEMBLY

(75) Inventors: Dieter Rückert, Reilingen (DE); Jörg Höfle, Jugenheim (DE)

(73) Assignee: Deere & Company, Moline, IL (US)

( * ) Notice: Subject to any disclaimer, the term of this patent is extended or adjusted under 35 U.S.C. 154(b) by 39 days.

(21) Appl. No.: 09/994,240

(22) Filed: Nov. 26, 2001

(65) Prior Publication Data

US 2002/0073796 A1 Jun. 20, 2002

(30) Foreign Application Priority Data

Dec. 7, 2000 (DE) ......................................... 100 60 803

(51) Int. Cl.⁷ ................................................. G05G 9/10
(52) U.S. Cl. ............... 74/473.3; 74/473.24; 74/471 XY
(58) Field of Search ........................... 74/473.1, 473.3, 74/473.33, 471 XY, 473.34, FOR 100, 473.24, 473.25, 473.26

(56) References Cited

U.S. PATENT DOCUMENTS

| | | | | |
|---|---|---|---|---|
| 3,057,222 A | * | 10/1962 | Almquist, Jr. ............... 74/473.3 |
| 3,082,639 A | * | 3/1963 | Almquist, Jr. ............ 74/473.33 |
| 3,172,301 A | * | 3/1965 | Hurst, Jr. et al. ......... 74/473.33 |
| 3,214,987 A | * | 11/1965 | Schenck et al. ............... 74/331 |
| 3,301,084 A | * | 1/1967 | Boda .......................... 477/113 |
| 3,323,387 A | * | 6/1967 | Hurst, Jr. et al. ........... 74/473.3 |
| 3,329,039 A | * | 7/1967 | Johnson ...................... 74/473.1 |
| 3,392,597 A | * | 7/1968 | Hermann .................... 74/473.1 |
| 3,633,436 A | * | 1/1972 | Freiburger .............. 74/471 XY |
| 3,636,793 A | * | 1/1972 | Bieber ........................ 74/473.1 |
| 3,744,336 A | * | 7/1973 | Lancaster ................. 74/473.33 |
| 3,779,096 A | * | 12/1973 | Hurst et al. ............... 74/473.22 |
| 3,975,970 A | * | 8/1976 | Elfes et al. ................. 74/473.1 |
| 4,028,959 A | * | 6/1977 | Long ......................... 74/473.23 |
| 4,129,046 A | * | 12/1978 | Lemcke, Jr. .............. 74/473.33 |
| 4,156,474 A | * | 5/1979 | Aida .......................... 180/328 |
| 4,222,284 A | * | 9/1980 | Bellino et al. .............. 74/473.1 |
| 4,273,004 A | * | 6/1981 | Morrison et al. ......... 74/473.24 |
| 4,510,817 A | * | 4/1985 | Kawamoto et al. ......... 74/473.1 |
| 4,513,847 A | * | 4/1985 | Hansen ..................... 192/219.5 |
| 4,515,029 A | * | 5/1985 | Reynolds et al. .............. 74/339 |
| 4,549,637 A | * | 10/1985 | Huckler et al. ............. 192/3.63 |
| 4,567,785 A | * | 2/1986 | Reynolds et al. ......... 74/473.24 |
| 4,664,221 A | * | 5/1987 | Loney et al. ................ 180/315 |
| 4,671,131 A | * | 6/1987 | Hurlow ................. 74/471 XY |
| 4,781,074 A | * | 11/1988 | Long ........................ 74/473.22 |
| 4,852,421 A | * | 8/1989 | Kerboul ................... 74/473.21 |
| 5,022,281 A | * | 6/1991 | Heizmann .................. 74/473.1 |
| 5,067,362 A | * | 11/1991 | Holdenried ................... 74/335 |
| 5,149,023 A | * | 9/1992 | Sakurai et al. .............. 244/229 |
| 5,819,590 A | * | 10/1998 | Kuwahara .................. 74/473.1 |
| 5,829,309 A | * | 11/1998 | Wagner et al. ........... 74/473.22 |
| 5,878,623 A | * | 3/1999 | Teich ......................... 74/473.3 |
| 5,878,861 A | * | 3/1999 | Altherr et al. ........... 192/220.1 |
| 6,170,353 B1 | * | 1/2001 | Worner et al. ........... 74/473.21 |
| 6,386,061 B1 | * | 5/2002 | Giefer ...................... 74/473.18 |

FOREIGN PATENT DOCUMENTS

| | | |
|---|---|---|
| DE | 38 31 310 | 3/1990 |
| DE | 40 02 932 A1 | 8/1991 |
| DE | 199 22 010 A1 | 11/2000 |
| EP | 0 384 062 | 8/1990 |

* cited by examiner

Primary Examiner—David A. Bucci
Assistant Examiner—Julie K. Smith

(57) ABSTRACT

A transmission shift lever assembly has a manually operated shift lever that can be moved in a longitudinal direction and in a transverse direction. The shift lever operates upon transmitting elements in order to transmit information to the vehicle gearbox or a gearbox control corresponding to the movement of the lever. The shift lever is coupled to a retainer, and a plurality of arms form four-bar linkages which couple the retainer to housing members so that the lever pivots about a virtual pivot axis which is repositioned remote from the lever, and so that the shift lever moves with little tilting motion.

12 Claims, 4 Drawing Sheets

TRANSMISSION SHIFT LEVER ASSEMBLY

FIELD OF THE INVENTION

The invention relates to a transmission shift lever assembly which has a lever which can be moved in longitudinal and transverse directions.

BACKGROUND OF THE INVENTION

It is well known to provide an agricultural tractor with a manually operable transmission shift lever. Such a lever cooperates with transmission elements to transmit information corresponding to the movement of the lever to a vehicle gearbox or to a gearbox control. Such a shift lever can be used to select differing gear ratios or groups of the vehicle gearbox. The shift lever can also be used to engage neutral positions or a park position.

Shift levers can be pivoted in two directions about two perpendicular axis along a shift path established by a shift gate. The shift gate may have a double "H" shape, which has a central neutral channel and two or three transverse channels. By moving the shift lever in an end region of one of the transverse channels, a gear ratio or a group of the gearbox can be selected and engaged. With such shift levers, the lever must be tilted during shifting.

DE-A-199 22 010 shows a sliding block which is fastened to a shift lever which interacts with quadrants of two transmission elements. By pivoting the shift lever in the longitudinal direction the sliding block can be moved from one quadrant to another quadrant, in order to select one of the quadrants. By pivoting the shift lever in the transverse direction the sliding block acts upon the selected quadrant and shifts the associated transmission element that is connected to the vehicle gearbox, whereby a gear ratio or a group of the vehicle gearbox is engaged.

It would be desirable to have a shift lever which is ergonomically designed and which has a compact configuration.

SUMMARY OF THE INVENTION

An object of the present invention is to provide a shift lever which is ergonomically designed and which has a compact configuration.

This and other objects are achieved by the present invention wherein a manually operated shift lever or selector lever is movable in a longitudinal direction and a transverse direction to select and engage differing gear ratios and/or gearbox groups and to select a park position. Transmitting levers transmit signals to a vehicle gearbox corresponding to the movement of the lever. The shift lever is coupled to a retainer or a bridge, and a pair of arms form four bar linkage which connects the retainer with a pair of plates.

A pair of rods interconnect and extend between the plates The shift lever is pivotally coupled to the rods by pairs of arms which form four-bar linkages. By varying the spacing between the ends of the arms, the pivot center or virtual pivot axis of rotation of the shift lever can be positioned near to or far from the shift lever in either direction, from minus infinity to plus infinity. If the arms are equally long and parallel to each other, then the pivot center will be located at infinity.

The virtual pivot axis of the shift lever can be positioned so that the shift lever moves with little or no tilting. Despite a relatively short lever length and relatively small longitudinal movement of the shift lever, comparatively large actuating movements are possible. Therefore, the shift lever assembly can be relatively small and compact and with improved ergonomics. The compact configuration and the reduced lateral movement of the shift lever permits a favorable positioning on a vehicle platform. The lever movements are short and uncomfortable tilting of the hand during shifting is avoided.

Preferably, one end of each arm is pivotally coupled to the retainer so that each arm is pivotal in a longitudinal direction with respect to the retainer. Preferably, the other end of each arm is pivotally coupled to one of the rods so that each arm is pivotal in a longitudinal direction with respect to rods and with respect to the housing. All these pivot axes are therefore parallel to each other.

Preferably, the shift lever is fixed to a central region of a bridge-shaped retainer, and a pair of arms are coupled to each side of the retainer. The resulting assembly has substantially symmetrical configuration and has an optimum force distribution, so that assembly can be relatively small and compact. A thrust piece is fastened on each side of the retainer. The thrust pieces interact with contact pieces of transmitting levers which are arranged between the thrust pieces.

Several transmitting levers are pivoted about a pivot pin which interconnects the housing members, each of which can transmit a corresponding signal to another device, such as the vehicle gearbox. Each of the transmitting levers has a contact piece which have contact surfaces thereon. A thrust piece is carried on by shift lever or by the retainer. By moving the shift lever in the longitudinal direction the thrust piece is brought into a position next to and opposite a contact surface of a selected transmitting lever. When the shift lever is moved in the transverse direction, the thrust piece engages contact surface and pivots the selected transmitting lever out of its neutral position, for example, into a gear ratio position.

Preferably, a plurality of transmitting levers are arranged between the two housing plates. For compactness, the transmitting levers are pivoted on a central longitudinal pivot pin which interconnects the housing plates. Each contact piece has two contact surfaces located opposite each other, each of which interacts with an associated thrust piece.

Preferably, the transmitting levers are provided with legs which can be connected with linkages which can be coupled to a vehicle gearbox. For example, shifting control cables can be hooked into openings in the legs. Also, sensors or switches may be arranged near to the legs, for transmitting shift signals to a gearbox control. Electrical switches could be integrated into the spacing elements Spacing elements are positioned between each adjacent pairs of transmitting levers. The spacing elements do not pivot with the transmitting levers, but are fixed to the housing members.

DESCRIPTION OF THE PREFERRED EMBODIMENT

Figure 1:
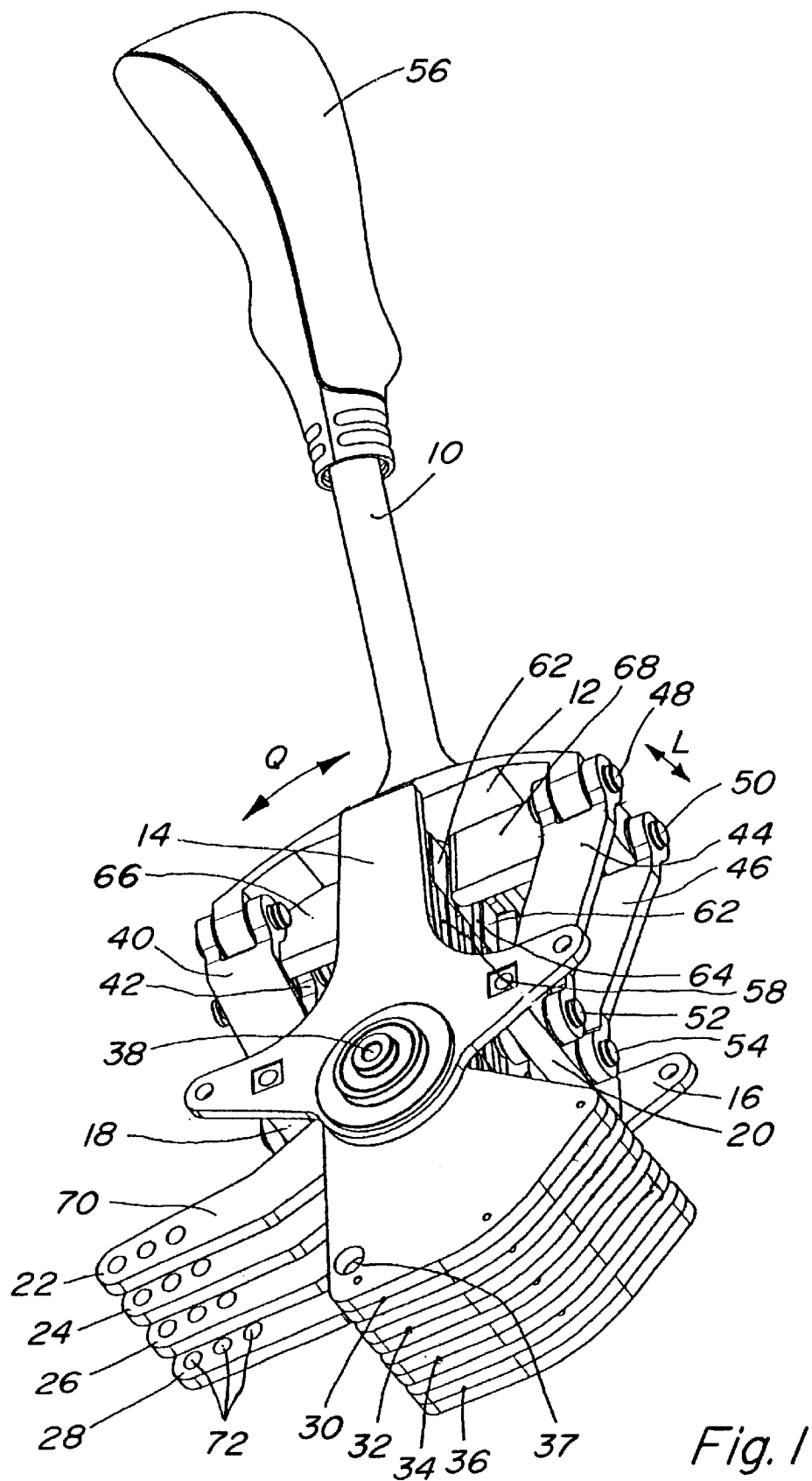
FIG. 1 shows a perspective view of a shift lever assembly according to the invention.

A shift lever 10 is mounted in the central region of a bridge or retainer 12 between two spaced apart housing plates 14,16. The plates are connected to each other by two spacing rods 18, 20. Four transmitting levers 22, 24, 26, 28 and four sheet metal spacers 30, 32, 34, 36 are stacked in alternating layers between the plates 14,16. The spacers 30, 32, 34, 36 have longitudinal bores 37 that are aligned with each other, through which a pin (not shown) is inserted, in order to fasten the spacers 30, 32, 34, 36 to a housing (not shown). The plates 14,16 and the transmitting levers 22, 24, 26, 28 are pivotally supported in bearings, on a longitudinally extending pivot pin 38, the ends of which are received by the plates 14, 16. Because the plates 14 and 16 are connected to each other by rods 18 and 20, the plates 14, 16 are constrained to pivot together about the longitudinal axis of pin 38.

Arms 40, 42, 44, 46 are coupled between the ends of the bridge 12 and the spacing rods 18, 20. A first end of each arms 40, 42, 44, 46 is pivotally coupled the bridge 12 by pivot pins 48, 50. A second end of each arms 40, 42, 44, 46 is pivotally coupled a corresponding rod 18, 20 by pivot pins 52, 54. All the pivot pins 48, 50, 52, 54 have axes which are parallel to each other and transverse to the axes of the rods 18, 20.

Figure 2:
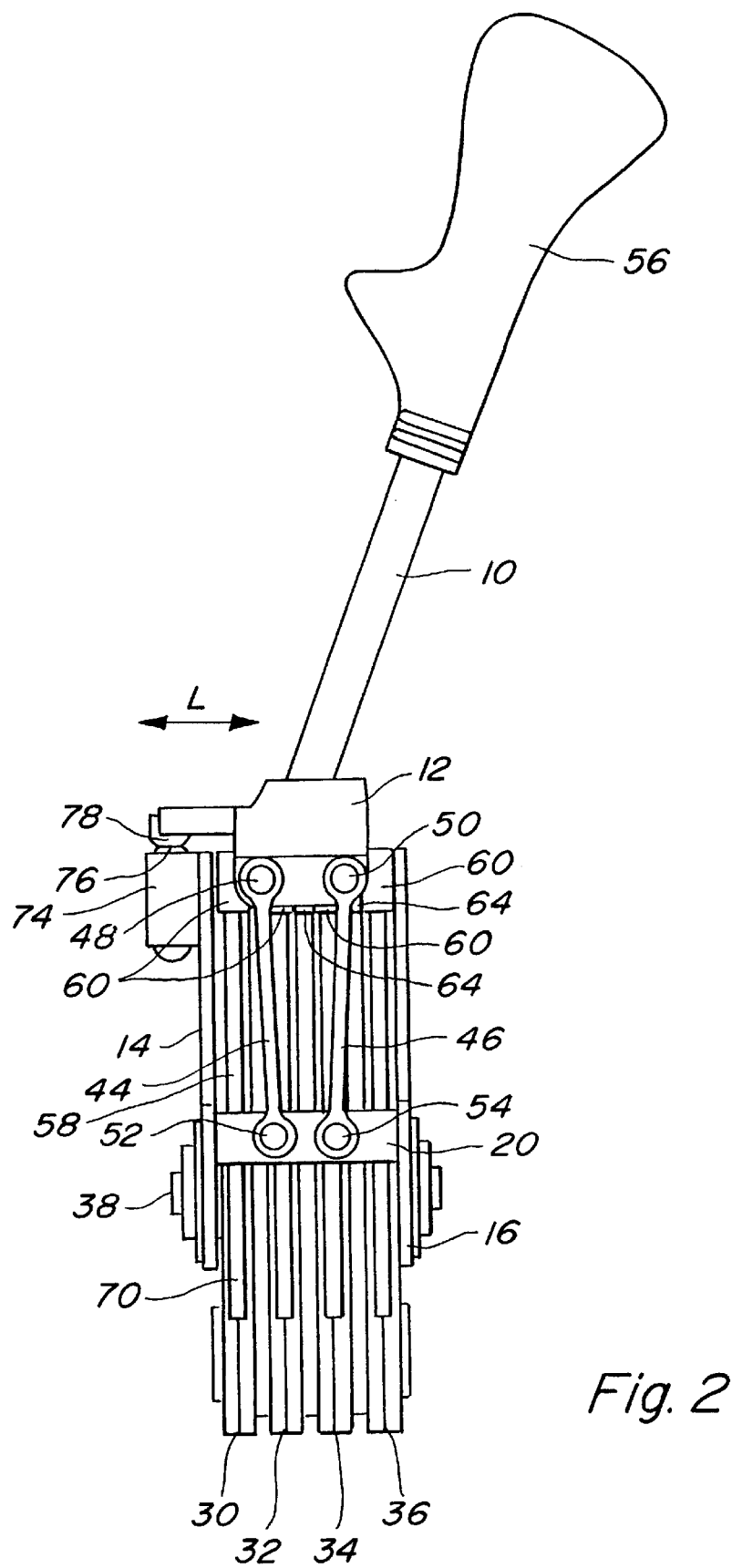
FIG. 2 shows the shift lever assembly according to FIG. 1 in the transverse direction.

Each pair of arms 40, 42, 44, 46 form a four-bar linkage together with the bridge 12 and a corresponding one of the rods 18, 20. As best seen in FIG. 2, the two arms 44, 46 are not parallel to each other because the spacing between pivot pins 48, 50 is greater than the spacing between the pivot pins 52, 54. The longitudinal axes of the two arms 44, 46 intersect at a virtual pivot axis (not shown) which is positioned downwardly and beyond the field of view of FIG. 2, and which is below the pin 38. Upon a movement of the shift lever 10 in the longitudinal direction L, the lever is pivoted about the virtual pivot axis, and because this point is located far away, the lever 10 and the handgrip 56 tilt only slightly. Alternatively, if the arms are parallel to each other, then the shift lever 10 translates without tilting.

The transmitting levers 22, 24, 26, 28 are all identical, and each includes a first leg 58 and a second leg 70. The first leg 58 extends from the pin 38 towards the lever 10. An end of each first leg 58 includes a contact piece or shift block 60, which has two contact surfaces 62 located opposite each other. Between each pair of adjacent contact pieces 60 there is a fixed spacer piece 64 connected to a corresponding one of spacers 30, 32, 34 36. At each end of the bridge 12 a thrust piece 66, 68 is fastened that is oriented in the transverse direction Q. The ends of the thrust pieces 66, 68 face towards the contact surfaces 62. By pivoting the shift lever 10 in the longitudinal direction L, the ends of the two thrust pieces 66, 68 can be located next to a selected contact piece 60. If the shift lever 10 is then pivoted together with plates 14, 16 in the transverse direction Q about pin 38, then one of the thrust pieces 66, 68 engages the corresponding contact surface 62 and pivots the associated transmitting lever 22, 24, 26, 28.

Figure 3:
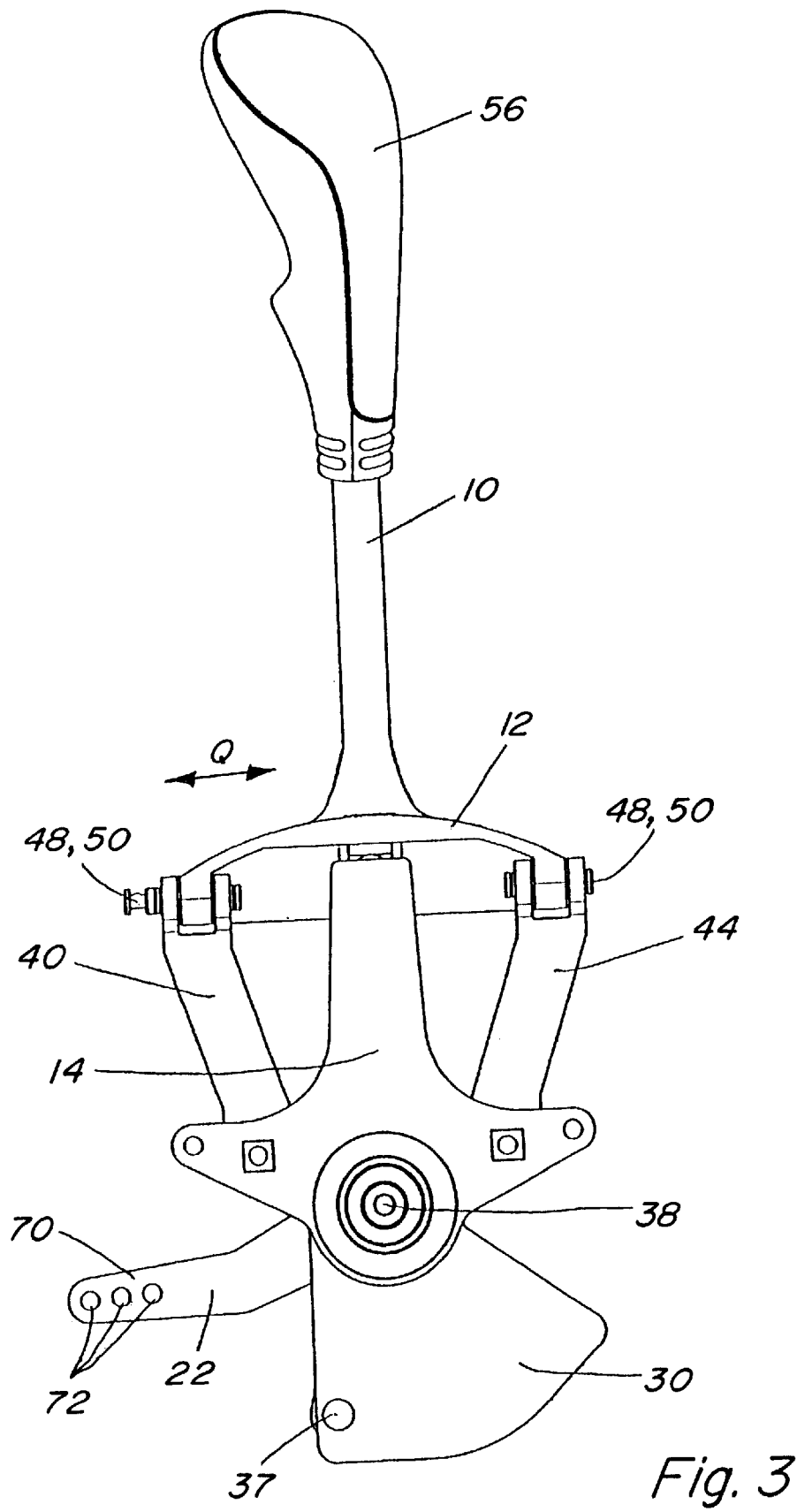
FIG. 3 shows the shift lever assembly according to FIG. 1 in the longitudinal direction.

The second leg 70 of each transmitting lever 22, 24, 26, 28 is oriented at an angle relative to the first leg 58 and projects laterally away from pin 38, as best seen in FIG. 3. Each second leg 70 includes three transverse bores 72. Control cables (not shown), such as push-pull cables, can be selectively hooked In the bores 72 and connected to a shift mechanism (not shown) of a vehicle gearbox (not shown). Each second leg 70 is rigidly connected to and moves in response to movement of the associated first leg 58. Upon a transverse deflection of the shift lever 10 the selected first leg 58 is pivoted and thereby pivots the associated second leg 70. This can cause a push-pull cable (not shown) to transmit the movement of the leg 70 to another device (not shown).

Referring now to FIG. 2, a detent arrangement 74 is fastened to plate 14 and includes a ball 76 which is urged by a spring (not shown), against a detent profile 78 fastened to the bridge 12. The detent profile 78 defines detent positions of the shift lever 10 in which the thrust pieces 66, 68 are located opposite a selected contact surface 62.

Figure 4:
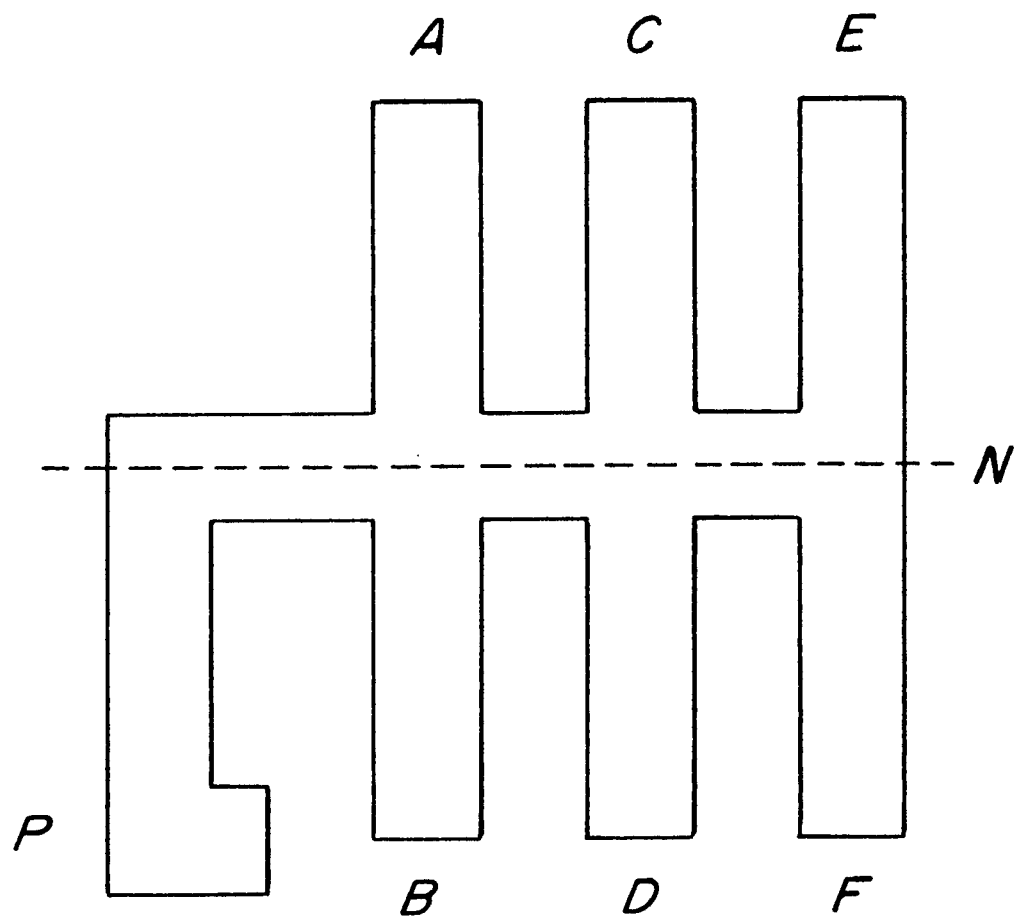
FIG. 4 shows the scheme of a shift gate.

Referring now to FIG. 4, the shift gate includes a neutral slot or channel N extending in the longitudinal direction from which three transverse channels branch off, each of whose end points corresponds to a group A, B, C, D, E, F of a vehicle gearbox (not shown). A hook-shaped transverse channel branches off from an end region of the neutral channel N, and corresponds to a park position P. The shift gate is mounted to receive the shift lever 10.

The resulting assembly has substantially symmetrical configuration and has an optimum force distribution, so that assembly can be relatively small and compact.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example, the arms could be arranged four-bar linkages employed for both directions of movement. For another example, a first pair of arms could be arranged for a first direction of movement between the lever retainer and an intermediate housing and a second pair of arms could be arranged for a second direction of movement between the intermediate housing and a final housing fixed to the vehicle. In general, however, a single arm arrangement is sufficient for the longitudinal movement, in which the shift lever is moved in a neutral channel.

What is claimed is:

1. A shift lever assembly having a manually operated shift lever movable in longitudinal and transverse directions, and operatively coupled to a plurality of transmitting levers which move in response to movement of the lever, the shift lever assembly comprising:
   a pair of plates which are spaced apart and which are connected to each other by a connecting member, the plates being thereby constrained to pivot together about a longitudinal axis, and the plurality of transmitting levers being located between the plates;
   a retainer fixed to the shift lever; and
   a pair of arms, each arm having a first end pivotally coupled to the retainer and a second end pivotally coupled to the connecting member.

2. The shift lever assembly of claim 1, wherein:
   the first end of each arm is pivotally coupled to the retainer about a pivot axis which extends in the transverse direction, and the second end of each arm is pivotally coupled to the connecting member about a pivot axis which also extends in the transverse direction.

3. The shift lever assembly of claim 1, wherein:
   all the arms have the same length.

4. The shift lever assembly of the claim 2, wherein:
   a spacing between the first ends of the arms is greater than a spacing between the second ends of the arms.

5. The shift lever assembly of claim 1, wherein:
   the shift lever is coupled to a central region of the retainer; and
   a first pair of arms is connected to one side of the retainer and a second pair of arms is connected to another side of the retainer.

6. The shift lever assembly of claim 5, wherein:

the two pairs of arms are arranged symmetrically with respect to the shift lever, and are coupled about pivot axes which are aligned with each other.

7. The shift lever assembly of claim 1, wherein:

the transmitting levers are pivotal about a fixed pivot pin, each transmitting lever having a contact piece which forms a contact surface; and a thrust piece coupled to the shift lever, upon longitudinal movement of the shift lever the thrust piece being selectively oriented next to one of the contact surfaces and engaged with one of the contacts surfaces upon transverse movement of the shift lever in order to pivot a selected one of the transmitting levers.

8. The shift lever assembly of claim 7, wherein:

the transmitting levers are arranged between the plates and pivotal about the pivot pin.

9. The shift lever assembly of claim 7, wherein:

each contact piece has a pair of contact surfaces located opposite to each other, and each contact surface interacts with a corresponding thrust piece.

10. The shift lever assembly of claim 1, wherein:

each transmitting lever has a leg which moves in response to movement of the shift lever.

11. The shift lever assembly of claim 1, wherein:

a spacing element is arranged between adjacent pairs of the transmitting levers.

12. The shift lever assembly of claim 1, wherein:

the arms, a portion of the retainer and a portion of the connecting member form a four-bar linkage which couples the retainer to the plates.

\* \* \* \* \*